United States Patent
Hoshino

(10) Patent No.: US 12,384,257 B2
(45) Date of Patent: Aug. 12, 2025

(54) VEHICLE CONTROLLER FOR REDUCTION OF POWER CONSUMPTION WHILE TOWING

(71) Applicant: TOYOTA JIDOSHA KABUSHIKI KAISHA, Aichi-ken (JP)

(72) Inventor: Yu Hoshino, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 196 days.

(21) Appl. No.: 18/446,471

(22) Filed: Aug. 9, 2023

(65) Prior Publication Data
US 2024/0051403 A1    Feb. 15, 2024

(30) Foreign Application Priority Data
Aug. 10, 2022 (JP) .................... 2022-128354

(51) Int. Cl.
*B60L 15/20* (2006.01)
*B60L 58/10* (2019.01)

(52) U.S. Cl.
CPC .......... *B60L 15/2045* (2013.01); *B60L 58/10* (2019.02); *B60L 2200/36* (2013.01); *B60L 2240/12* (2013.01); *B60L 2240/54* (2013.01)

(58) Field of Classification Search
None
See application file for complete search history.

(56) References Cited

U.S. PATENT DOCUMENTS

| | | | | |
|---|---|---|---|---|
| 10,421,366 | B2* | 9/2019 | Birkenbeil | B60L 1/02 |
| 11,072,321 | B2* | 7/2021 | Wenger | B60W 20/13 |
| 11,247,570 | B2* | 2/2022 | Oh | B60W 30/18127 |
| 11,342,568 | B2* | 5/2022 | Umayahara | B60L 3/00 |
| 11,801,757 | B2* | 10/2023 | Sawada | B60L 15/20 |
| 11,983,969 | B2* | 5/2024 | Biberstein | B60R 16/0236 |
| 12,162,360 | B2* | 12/2024 | Kirchhoff | B60L 1/02 |
| 2022/0260378 | A1* | 8/2022 | Hanchett | G01C 21/3461 |
| 2023/0173950 | A1* | 6/2023 | Wu | H01M 8/04925 701/22 |
| 2024/0051421 | A1* | 2/2024 | Du | B60L 3/00 |

FOREIGN PATENT DOCUMENTS

JP    2014-045587 A    3/2014

* cited by examiner

*Primary Examiner* — Todd Melton
(74) *Attorney, Agent, or Firm* — HAUPTMAN HAM, LLP

(57) ABSTRACT

A vehicle controller that is configured to control traveling of an electric vehicle which is a battery electric automobile or a fuel cell automobile, in which, when the electric vehicle performs towing, the vehicle controller judges whether or not power consumption reduction is needed based on an output of a battery that is configured to supply electric power to a traveling motor and the amount of remaining stored energy, and partially limits the function of the electric vehicle if the power consumption reduction is needed, and the amount of remaining stored energy is the amount of remaining charge in the battery when the electric vehicle is the battery electric automobile, and is the amount of remaining stored hydrogen when the electric vehicle is the fuel cell automobile.

9 Claims, 7 Drawing Sheets

VEHICLE CONTROLLER FOR REDUCTION OF POWER CONSUMPTION WHILE TOWING

CROSS REFERENCE TO RELATED APPLICATION

This application claims priority to Japanese Patent Application No. 2022-128354 filed on Aug. 10, 2022, which is incorporated herein by reference in its entirety including the specification, claims, drawings, and abstract.

TECHNICAL FIELD

This specification discloses a vehicle controller that is configured to control traveling of an electric vehicle which is a battery electric automobile or a fuel cell automobile.

BACKGROUND

Heretofore, electric vehicles that travel by power output from a traveling motor have been widely known. Such electric vehicles include battery electric automobiles and fuel cell automobiles.

When towing another vehicle, such an electric vehicle consumes more power than in a case where the electric vehicle travels alone. This causes a problem that the vehicle's cruising distance becomes shorter.

In order to suppress an increase in power consumption due to towing, Patent Document 1 discloses a technique of lowering a limit value of electric power flowing through a switching element when towing is in being performed as compared to a case where towing is not being performed. According to the technique of Patent Document 1, since power consumption is reduced when towing is being performed, it is possible to suppress a decrease in the vehicle's cruising distance due to towing.

CITATION LIST

PATENT DOCUMENT 1: JP 2014-045587 A

However, even when towing is being performed, a required cruising distance can be achieved if the vehicle has a sufficient amount of remaining stored energy or consumes relatively small electric power. Meanwhile, when a limit value of electric power flowing through a switching element is lowered, a vehicle speed is limited and the function of an air conditioner is limited. In other words, according to the technique of Patent Document 1, the behavior of the vehicle desired by an occupant cannot be achieved when towing is being performed.

To address this, this example discloses a vehicle controller capable of implementing the behavior of the vehicle desired by the occupant as much as possible while achieving a required cruising distance.

SUMMARY

A vehicle controller disclosed in this specification is a vehicle controller that is configured to control traveling of an electric vehicle which is a battery electric automobile or a fuel cell automobile, in which, when the electric vehicle performs towing, the vehicle controller judges whether or not power consumption reduction is needed, based on an output of a battery that is configured to supply electric power to a traveling motor and the amount of remaining stored energy, and partially limits the function of the electric vehicle if the power consumption reduction is needed, and the amount of remaining stored energy is the amount of remaining charge in the battery when the electric vehicle is the battery electric automobile, and is the amount of remaining stored hydrogen when the electric vehicle is the fuel cell automobile.

With such a configuration, even when towing is being performed, the function of the vehicle may not be limited, depending on the output of the battery and the amount of remaining stored energy. Accordingly, it is possible to implement the behavior of the vehicle desired by the occupant as much as possible while achieving a required cruising distance.

In this case, the vehicle controller may judge that the power consumption reduction is needed if the output of the battery is equal to or larger than a predetermined reference output and the amount of remaining stored energy is equal to or smaller than the amount of reference remaining energy.

With such a configuration, no function limitation is imposed if the output of the battery is small or the amount of remaining stored energy is large. Thus, it is possible to implement the behavior of the vehicle desired by the occupant as much as possible while achieving a required cruising distance.

Meanwhile, the vehicle controller may judge whether or not the power consumption reduction is needed based on a distance to a point at which energy is to be supplied, in addition to the output of the battery and the amount of remaining stored energy.

With such a configuration, no function limitation is imposed, depending on the distance to the point at which energy is to be supplied. Thus, it is possible to implement the behavior of the vehicle desired by the occupant as much as possible while achieving a required cruising distance.

Meanwhile, if the power consumption reduction is needed, the vehicle controller may execute at least one of: reduction of a vehicle speed; limitation on the output of the battery; forcible switching of an air conditioner to an internal air circulation operation mode; and limitation on an output of the air conditioner.

Such a configuration makes it possible to reduce power consumption and achieve a required cruising distance.

Meanwhile, if the power consumption reduction is needed, the vehicle controller may change how the function is limited and the amount of limitation based on at least one of the output of the battery and the amount of remaining stored energy.

Such a configuration makes it possible to suppress an adverse effect caused by the function limitation.

Meanwhile, the vehicle controller may judge whether or not the towing is being performed based on at least one of a hitch signal output from a hitch sensor and the output of the battery relative to a vehicle speed.

Such a configuration makes it possible to properly judge whether or not towing is being performed.

According to the technique disclosed in this specification, it is possible to implement the behavior of the vehicle desired by the occupant as much as possible while achieving a required cruising distance.

BRIEF DESCRIPTION OF DRAWINGS

An embodiment of the present disclosure will be described based on the following figures, wherein.

DESCRIPTION OF EMBODIMENTS

Figure 1:
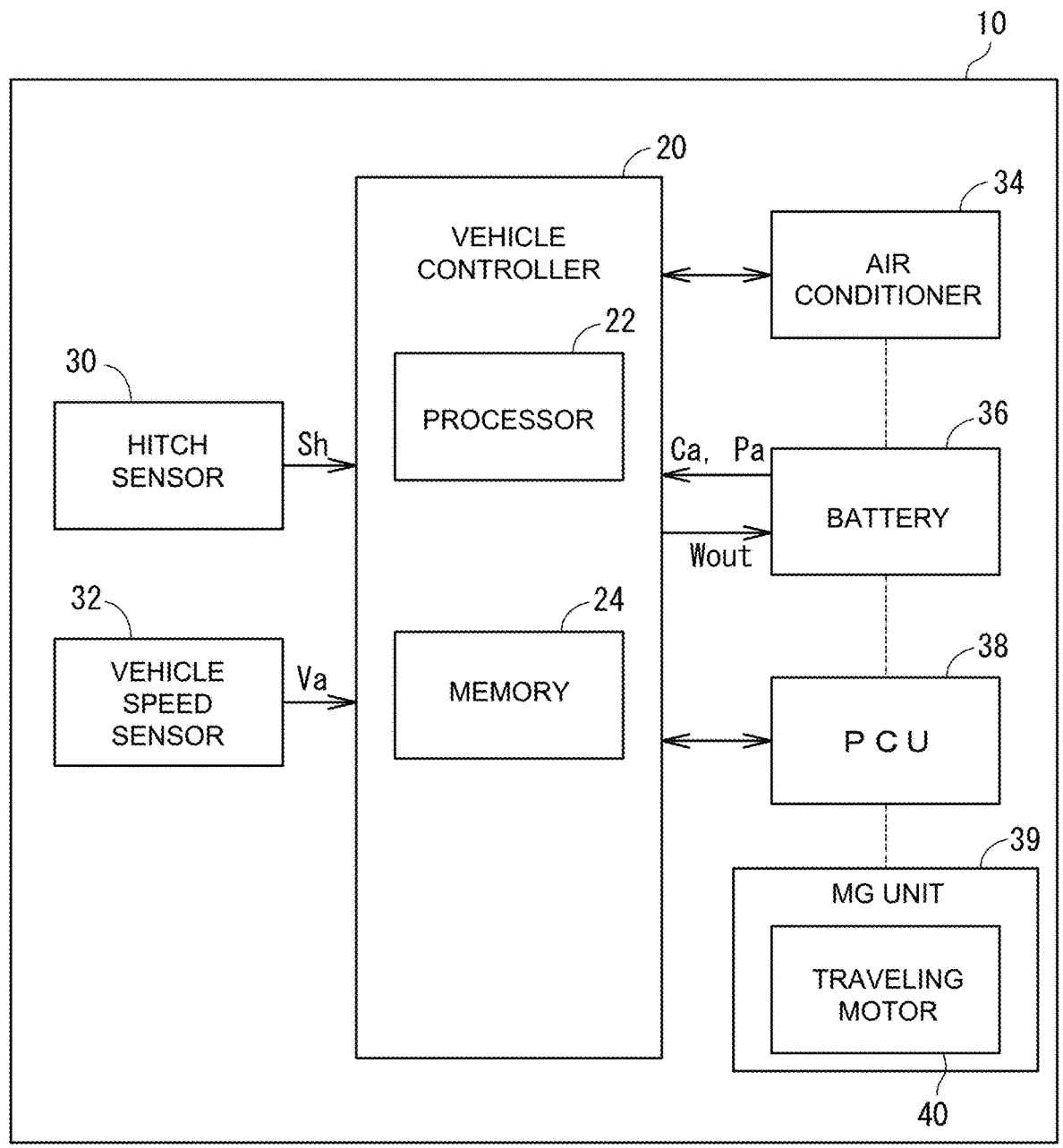
FIG. 1 is a block diagram illustrating the configuration of an electric vehicle.

Hereinbelow, the configuration of a vehicle controller 20 will be described with reference to the drawings. FIG. 1 is a block diagram illustrating the configuration of an electric vehicle 10 equipped with the vehicle controller 20. This electric vehicle 10 is a battery electric automobile using electric power accumulated in a battery 36 as its energy source. In addition, the electric vehicle 10 includes a towing hitch (not illustrated) that is coupled to another vehicle (such as a trailer) via a towing bar when the electric vehicle tows this vehicle.

As will be described in detail later, the vehicle controller 20 is configured to judge whether or not towing is being performed and, when towing is being performed, partially limit the function of the electric vehicle 10 according to output power Pa of the battery 36 and a charging rate Ca of the battery 36. The vehicle controller 20 is physically a computer having a processor 22 and a memory 24. This "computer" may be a micro-controller in which a computer system is embedded in a single integrated circuit. In addition, the vehicle controller 20 is not limited to a single computer, and may be constituted of multiple computers that are located physically away from each other.

A vehicle speed sensor 32 is configured to detect a traveling speed of the electric vehicle 10 and transmit its result to the vehicle controller 20 as a vehicle speed Va. A hitch sensor 30 is a sensor provided to a towing hitch, and is configured to detect whether or not towing is being performed and transmit its result to the vehicle controller 20 as a hitch signal Sh. As the hitch sensor 30, a load sensor or the like that is configured to detect a load applied to the towing hitch maybe used, for example.

The battery 36 includes a secondary battery capable of charging and discharging, for example. The secondary battery included in the battery 36 is configured to accumulate electric power for traveling of the electric vehicle 10 and electric power for driving electric components including an air conditioner 34. A lithium-ion battery may be employed as the secondary battery, for example. Note, however, that the secondary battery is not limited to a lithium-ion battery, and other secondary batteries (such as a nickel hydride battery) may be employed. In addition, as the battery 36, an electrolyte secondary battery may be employed, or alternatively a full-solid secondary battery may be employed. The battery 36 can be charged from an external power source as needed.

The ratio of the amount of remaining charge in this battery 36 to its fully charged amount is transmitted to the vehicle controller 20 as the charging rate Ca. In the battery electric automobile, the charging rate Ca is a parameter indicating the amount of remaining stored energy. In addition, an output upper limit Wout of electric power input and output to and from the battery 36 is managed by the vehicle controller 20.

A power control unit (hereinafter referred to as a "PCU") 38 is constituted of a controller including a processor, an inverter, and a converter (all of which are not illustrated), for example. The controller of the PCU 38 is configured to receive an instruction (control signal) from the vehicle controller 20 and control the inverter and the converter according to this instruction. The vehicle controller 20 is configured to control a traveling motor 40 and the vehicle speed Va via the PCU 38.

An MG unit 39 includes at least one motor generator. Each motor generator functions as an electric motor that is configured to convert electric power supplied from the battery 36 via the PCU 38 into power, and also functions as a power generator that is configured to convert braking power into electric power. In addition, the at least one motor generator includes the traveling motor 40 that is configured to output power for traveling of a vehicle. The at least one motor generator including the traveling motor 40 is driven and controlled by the PCU 38.

The air conditioner 34 is an electric component that is configured to adjust a temperature inside a vehicle compartment. For example, the air conditioner 34 is a heat pump type air conditioner that is configured to cool down and warm up the vehicle compartment by expansion/contraction of refrigerant and heat exchange between the refrigerant and another fluid. The air conditioner 34 is driven by power supply from the battery 36. The vehicle controller 20 performs control to drive the air conditioner 34 in response to an operation instruction from an occupant. The air conditioner 34 is capable of operating in an external air introduction operation mode in which cooling and heating is performed while taking in the air outside the vehicle, and in an internal air circulation operation mode in which cooling and heating is performed while circulating the air inside the vehicle. In general, the internal air circulation operation mode can achieve a greater reduction in power consumption than can the external air introduction operation mode.

Next, power consumption management by the vehicle controller 20 will be described. As described previously, the vehicle controller 20 judges whether or not towing is being performed and, when towing is being performed, partially limits the function of the electric vehicle 10 according to the output power Pa of the battery 36 and the charging rate Ca of the battery 36. The vehicle controller has such a configuration in order to implement the behavior of the vehicle desired by the occupant as much as possible while achieving a required cruising distance.

Specifically, in a case where the electric vehicle 10 is towing another vehicle, the amount of electric power required for traveling of the electric vehicle 10 increases significantly as compared to a case where towing is not being performed. Accordingly, when towing is being performed, the charging rate Ca of the battery 36 decreases so drastically that a sufficient cruising distance may not be able to be achieved. To cope with this, when towing is being performed, it is conceivable to forcibly decrease the output upper limit Wout of the output power Pa from the battery 36 to forcibly reduce power consumption. Such a configuration makes it possible to achieve a sufficient cruising distance. However, in the case of forcibly reducing power consumption, measures need to be taken such as decreasing the vehicle speed Va and limiting the function of the air conditioner 34, and therefore the behavior of the vehicle desired by the occupant cannot be implemented.

Thus, even when towing is being performed, the vehicle controller 20 of this example does not forcibly reduce power consumption if the output power Pa is small or the charging rate Ca is high. This prevents the vehicle speed Va from being decreased and prevents the function of the air conditioner 34 from being limited against the occupant's will. On the other hand, if the output power Pa is large and the charging rate Ca is low when towing is being performed, the vehicle controller 20 partially limits the function of the electric vehicle 10 to forcibly reduce power consumption. This makes it possible to achieve a sufficient cruising distance even when towing is being performed. Hereinbelow, a flow of this processing on power consumption management will be described with reference to FIG. 2.

Figure 2:
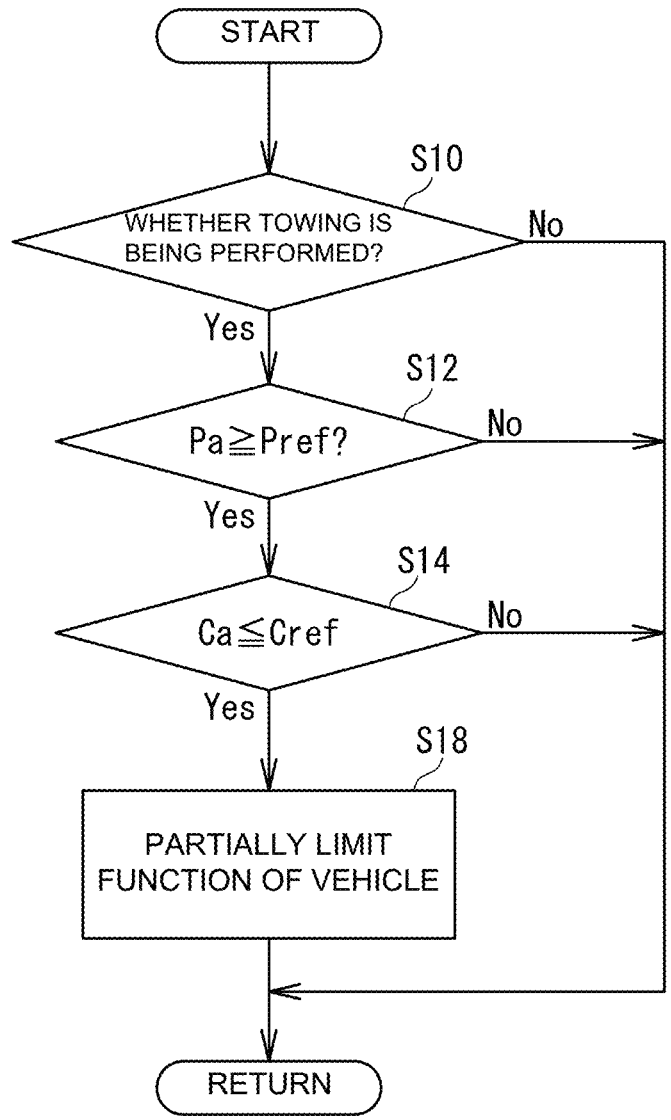
FIG. 2 is a flowchart illustrating a flow of processing on power consumption management.
Figure 3:
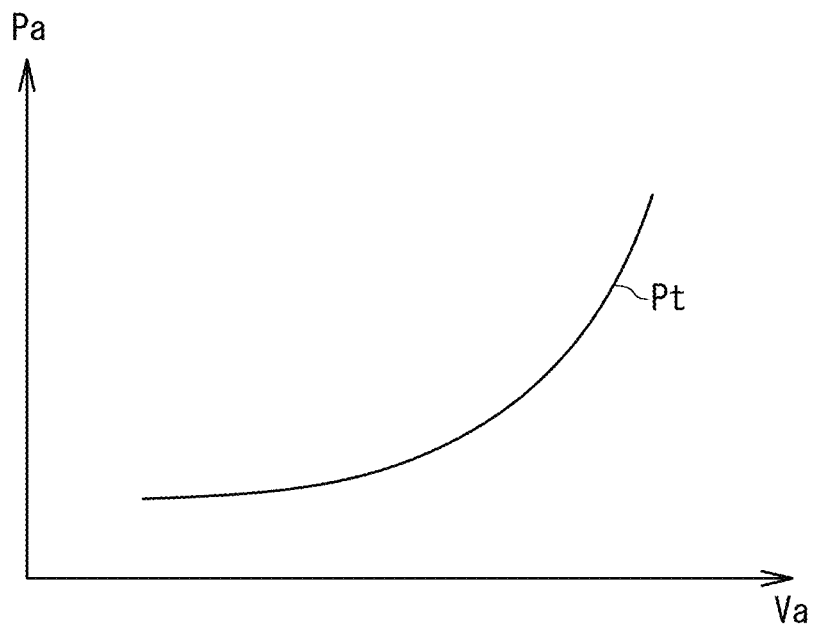
FIG. 3 is a diagram illustrating an example of an output power threshold at which towing is deemed to be performed.

As illustrated in FIG. 2, the vehicle controller 20 monitors whether or not towing is being performed (S10). Here, whether or not towing is being performed may be judged based on the hitch signal Sh, for example. Alternatively, in another mode, the vehicle controller 20 may judge whether or not towing is being performed based on the output power Pa relative to the vehicle speed Va instead of or in addition to the hitch signal Sh. In this case, the vehicle controller 20 previously stores a threshold Pt of the output power Pa at which towing is deemed to be performed. This threshold Pt varies depending on the vehicle speed Va. FIG. 3 is a diagram illustrating an example of the threshold Pt. In FIG. 3, the horizontal axis indicates the vehicle speed Va of the electric vehicle 10, and the vertical axis indicates the output power Pa of the battery 36. In the example of FIG. 3, the threshold Pt increases as the vehicle speed Va increases. The vehicle controller 20 may judge that towing is being performed if the current output power Pa is equal to or higher than this threshold Pt.

If towing is being performed (Yes in S10), the vehicle controller 20 compares the output power Pa of the battery 36 with a reference output Pref (S12). The reference output Pref is a value sufficiently larger than the output power Pa observed when towing is not being performed. The value of the reference output Pref is determined in advance and stored in the memory 24. This reference output Pref may be a fixed value, or may be a variable value that varies depending on the season, the vehicle speed Va, and the like.

If the output power Pa is lower than the reference output Pref (No in S12), the possibility that this will result in an insufficient cruising distance is conceivably low. In this case, the vehicle controller 20 judges that no power consumption reduction is needed, and returns the process to Step S10 without limiting the function of the vehicle to be described later.

On the other hand, if the output power Pa is equal to or higher than the reference output Pref (Yes in S12), the vehicle controller 20 compares the charging rate Ca of the battery 36 (i.e., the amount of remaining energy) with a reference charging rate Cref (S14). The reference charging rate Cref is a charging rate conceived as necessary to achieve a sufficient cruising distance, and is the amount of remaining energy used as a reference. The value of the reference charging rate Cref is also determined in advance and stored in the memory 24. This reference charging rate Cref may be a fixed value, or may be a variable value that varies depending on the season, the vehicle speed Va, and the like.

If the charging rate Ca is higher than the reference charging rate Cref (No in S14), the possibility that this will result in an insufficient cruising distance is conceivably low. In this case, the vehicle controller 20 judges that no power consumption reduction is needed, and returns the process to Step S10 without limiting the function of the vehicle.

On the other hand, if the charging rate Ca is equal to or lower than the reference charging rate Cref (Yes in S14), the vehicle controller 20 judges that power consumption reduction is needed. In this case, in order to reduce power consumption of the vehicle, the vehicle controller 20 partially limits the function of the vehicle as compared to a case where towing is not being performed (S18). Specifically, the vehicle controller 20 executes at least one of: reduction of the vehicle speed Va; reduction of the output upper limit Wout of the output power Pa of the battery 36; limitation on the output of the air conditioner 34; and forcible switching of the air conditioner to the internal air circulation operation mode. The limitation on the output of the air conditioner 34 can be achieved by increasing a target temperature of an evaporator during cooling operation or increasing an upper limit of the rotation speed of a blower, for example. Meanwhile, if the air conditioner operates in the internal air circulation operation mode during heating operation, windows may be fogged. For this reason, the forcible switching to the internal air circulation operation mode is executed during cooling operation. In any case, by executing at least one of these, it is possible to reduce power consumption of the battery 36 and achieve a sufficient cruising distance. Note that, when starting to partially limit the above functions, the vehicle controller 20 may notify the occupant of a message saying that such function limitation is to be started in order to achieve sufficient cruising distance.

As is clear from the above description, in this example, if the output power Pa is high and the charging rate Ca is low when towing is being performed, the function of the vehicle is partially limited. Thereby, power consumption can be reduced and a sufficient cruising distance can be achieved. On the other hand, even when towing is being performed, the function of the vehicle is not limited if the output power Pa is low or the charging rate Ca is high. Thereby, the behavior of the vehicle desired by the occupant can be implemented.

Figure 4:
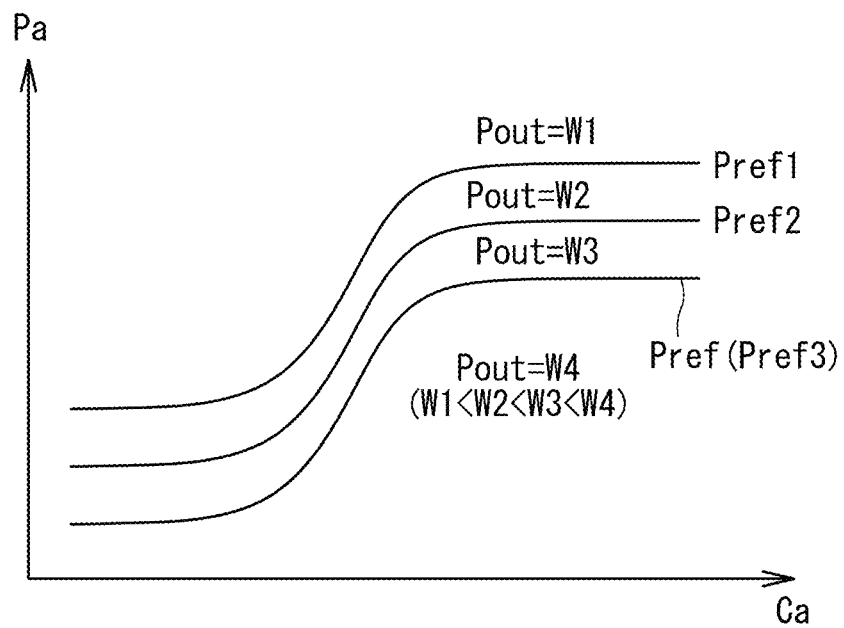
FIG. 4 is a diagram illustrating an example of a reference output that varies depending on a charging rate.

Note that, in the example of FIG. 2, it is judged whether or not power consumption reduction is needed and whether or not the function limitation is needed, based on the comparison result between the output power Pa and the reference output Pref and the comparison result between the charging rate Ca and the reference charging rate Cref; however, another mode may be employed for judging whether or not the function limitation is needed based on the output power Pa and the charging rage Ca. For example, with the reference output Pref set as a variable value that varies depending on the charging rate Ca, whether or not the function limitation is needed may be judged based on comparison between this reference output Pref and the output power Pa. FIG. 4 is a diagram illustrating an example of the reference output Pref in this case. In FIG. 4, the horizontal axis indicates the charging rate Ca, and the vertical axis indicates the output power Pa. In the example of FIG. 4, the reference output Pref decreases drastically when the charging rate Ca becomes equal to or lower than a certain value. The vehicle controller 20 identifies the value of the reference output Pref corresponding to the current charging rate Ca, and partially limits the function of the vehicle if the current output power Pa of the battery 36 is equal to or higher than the reference output Pref thus identified. Even when the output power Pa is high, this configuration can avoid the function limitation when the charging rate Ca is high. On the other hand, even when the output power Pa is low to some extent, the function limitation is started when the charging rate Ca is low. This makes it possible to prevent an insufficient cruising distance more reliably.

Meanwhile, how the function of the vehicle is limited or the amount of limitation may be changed based on at least one of the output power Pa and the charging rate Ca. For example, the vehicle controller 20 may change how the function is limited according to the magnitude of the charging rate Ca. For example, the vehicle controller 20 previously stores a first reference charging rate Cref1 and a second reference charging rate Cref2 that is lower than the first reference charging rate Cref1. In a case where the vehicle's function limitation is needed, the vehicle controller 20 may limit the output of the air conditioner 34 if the charging rate Ca is equal to or lower than the first reference charging rate Cref1 and is higher than the second reference charging rate Cref2, and may limit the vehicle speed Va in addition to limiting the output of the air conditioner 34 if the charging rate Ca is equal to or lower than the second reference charging rate Cref2.

Meanwhile, the upper limit Wout of the output power Pa may be reduced as the output power Pa becomes higher or as the charging rate Ca becomes lower. For example, the vehicle controller 20 may previously store three reference outputs Pref1, Pref2, and Pref3 as illustrated in FIG. 4. In the example of FIG. 4, the first reference output Pref1 is higher than the second reference output Pref2, and the second reference output Pref2 is higher than the third reference output Pref3. While towing is being performed, if the output power Pa is equal to or higher than the first reference output Pref1, the vehicle controller 20 sets the upper limit Wout of the output power to W1. In addition, the vehicle controller 20 may set Wout to W2 (here, W2>W1) if the output power Pa satisfies Pref1>Pa≥Pref2, and set Wout to W3 (here, W3>W2) if the output power Pa satisfies Pref2>Pa≥Pref3. This configuration makes the upper limit Wout of the output power Pa lower as the current output power Pa becomes higher. This makes it possible to more reliably achieve a sufficient cruising distance and implement the behavior of the vehicle desired by the occupant at the same time.

Figure 5:
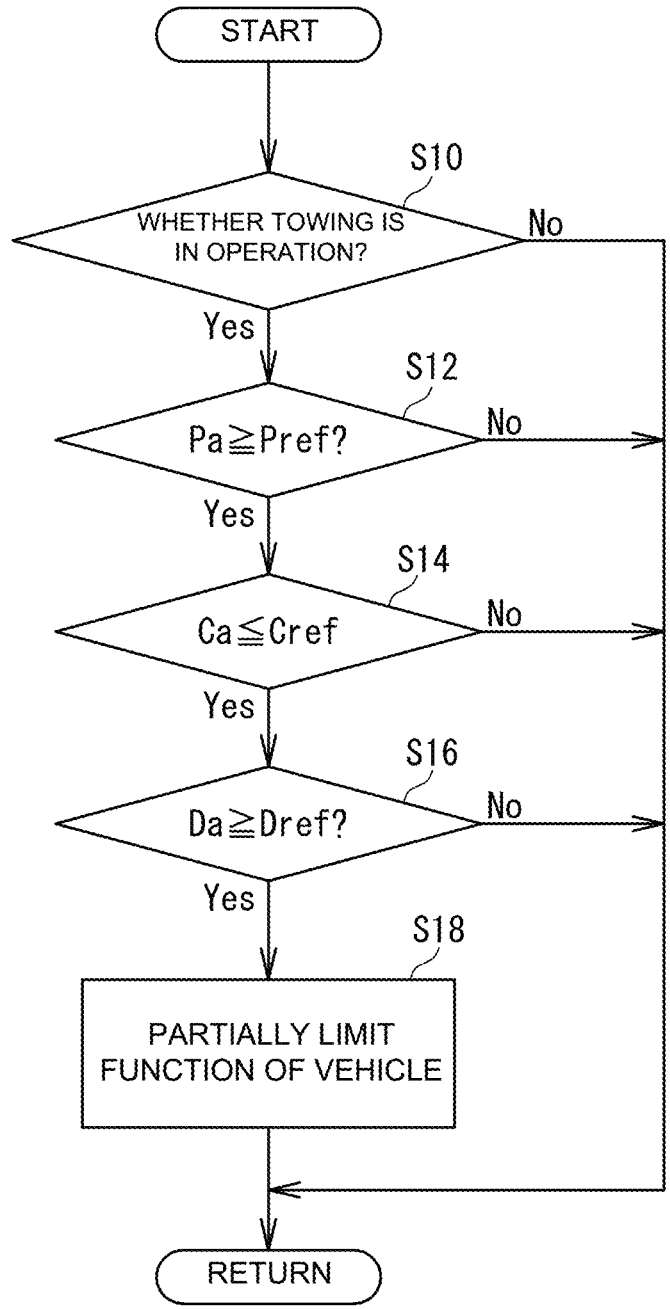
FIG. 5 is a flowchart illustrating another example of a flow of processing on power consumption management.

Meanwhile, in the above description, whether or not power consumption reduction is needed is judged based on the output power Pa and the charging rate Ca. However, whether or not the vehicle's function limitation is needed may be judged in consideration of another parameter in addition to the output power Pa and the charging rate Ca. For example, the vehicle controller 20 may judge whether or not the function limitation is needed based on the output power Pa, the charging rate Ca, and a distance Da to a point at which power is to be supplied (power supply point). FIG. 5 is a flowchart illustrating a flow of power consumption management in this case.

As illustrated in FIG. 5, in this case, the vehicle controller 20 also judges whether or not towing is being performed (S10), compares the output power Pa with the reference output Pref (S12), and compares the charging rate Ca with the reference charging rate Cref (S14). In addition, if towing is being performed, Pa≥Pref is satisfied, and Ca≤Cref is satisfied (Yes in S14), the vehicle controller 20 further compares the distance Da to the power supply point with a reference distance Dref (S16).

The power supply point is a point at which energy is to be supplied. This power supply point is a point equipped with charging equipment, and is a charging station or home, for example. The location of the power supply point is registered in a vehicle's navigation system in advance. The vehicle controller 20 acquires the moving distance Da from the present location to the power supply point using the function of the navigation system.

The value of the reference distance Dref is determined in advance and stored in the memory 24. This reference distance Dref may be a fixed value, or may be a variable value that varies depending on at least one of the output power Pa and the charging rate Ca. Accordingly, the reference distance Dref may be a variable value that decreases as the output power Pa increases, or may be a variable value that decreases as the charging rate Ca decreases, for example. Alternatively, in another mode, the vehicle controller 20 may set the reference distance Dref by estimating the distance that the vehicle can travel until the charging rate Ca reaches a prescribed allowable lower limit based on an average value of the latest output power Pa and the current charging rate Ca and setting the travel distance thus estimated as the reference distance Dref.

As a result of the comparison between the distance Da to the power supply point and the reference distance Dref, if Da<Dref is satisfied (No in S16), the vehicle controller 20 judges that, since the battery 36 will be charged in the near future, the possibility that the cruising distance will become insufficient is low. In this case, the vehicle controller 20 judges that no power consumption reduction is needed, and returns the process to Step S10 without limiting the function of the vehicle.

On the other hand, if Da≥Dref is satisfied (Yes in S16), the vehicle controller 20 judges that there is a possibility that the cruising distance will become insufficient. In this case, the vehicle controller 20 limits the function of the vehicle (S18).

In this manner, by judging whether or not the function limitation is needed in consideration of the distance Da to the power supply point in addition to the output power Pa and the charging rate Ca, it is possible to reduce the chance of executing the function limitation and to implement the behavior of the vehicle desired by the occupant more reliably.

Figure 6:
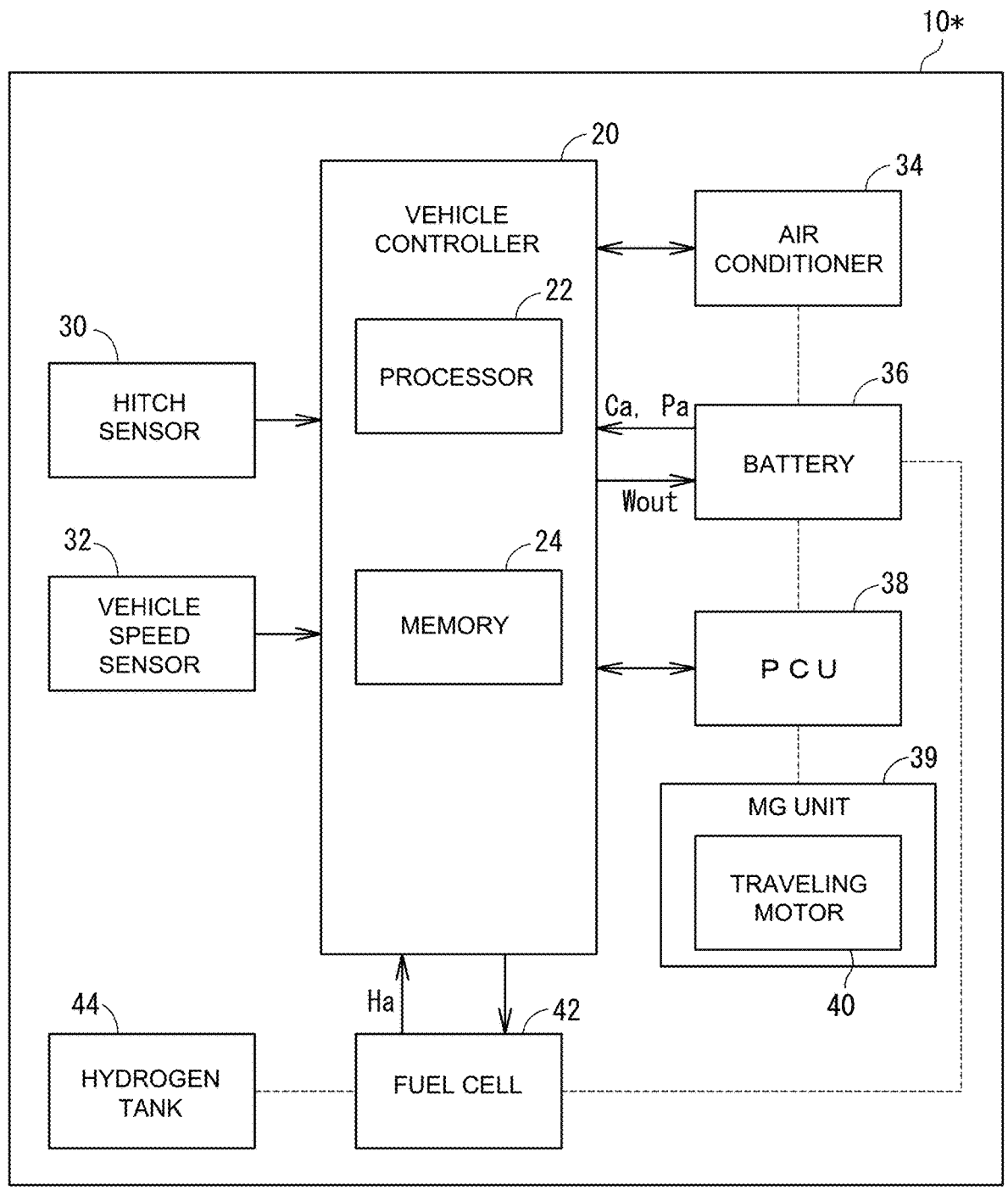
FIG. 6 is a block diagram illustrating the configuration of an electric vehicle of another example.

In the above description, the battery electric automobile equipped with only the battery 36 as its energy source has been cited as an example. However, the technique disclosed in this specification may be applied to a fuel cell automobile equipped with a fuel cell. FIG. 6 is a block diagram illustrating an example of an electric vehicle 10* that is a fuel cell automobile. In this case, the electric vehicle 10* includes a hydrogen tank 44 that stores hydrogen, and a fuel cell 42. The amount of remaining hydrogen in the hydrogen tank 44 (i.e., the amount of remaining energy) is detected by a sensor and transmitted to the vehicle controller 20 as an amount of remaining hydrogen Ha. The fuel cell 42 is a power generating device that is configured to generate power by reaction of hydrogen with oxygen. Electric power generated in the fuel cell 42 is stored in the battery 36. The vehicle controller 20 is configured to control the amount of power to be generated in this fuel cell 42.

Figure 7:
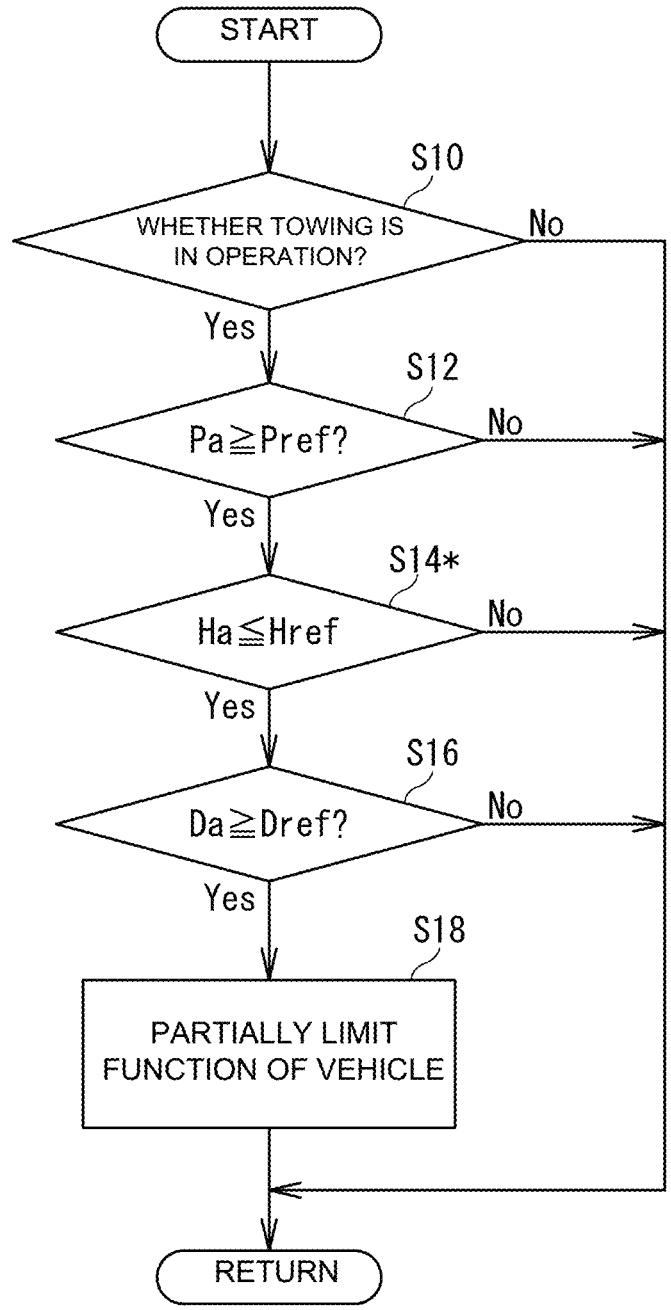
FIG. 7 is a flowchart illustrating a flow of processing on power consumption management executed by a vehicle controller of FIG. 6.

FIG. 7 is a flowchart illustrating a flow of processing on power consumption management executed by the vehicle controller 20 of FIG. 6. As is clear from FIG. 7, in this case, the vehicle controller 20 compares the amount of remaining hydrogen Ha (i.e., the amount of remaining energy) with a reference amount of remaining hydrogen (S14*) instead of the comparison between the charging rage Ca and the reference charging rate Cref. If Ha>Href is satisfied (No in S14*), the vehicle controller 20 judges that no function limitation is needed. On the other hand, if Ha≤Href is satisfied (Yes in S14*), the vehicle controller 20 makes the process proceed to Step S16 to compare the distance Da to a point at which energy is to be supplied (energy supply point) with the reference distance Dref. Note that, in this case, the energy supply point is a hydrogen station, for example.

In addition, although only the amount of remaining hydrogen Ha is monitored as the amount of remaining energy in FIG. 7, the charging rate Ca of the battery 36 may also be monitored. For example, even when the amount of remaining hydrogen Ha≤Href is satisfied, the possibility that the cruising distance will become insufficient may be judged as low if the charging rate Ca of the battery 36 is higher than the predetermined reference charging rate Cref.

REFERENCE SIGNS LIST 10, 10* ELECTRIC VEHICLE
20 VEHICLE CONTROLLER
22 PROCESSOR
24 MEMORY
30 HITCH SENSOR
32 VEHICLE SPEED SENSOR
34 AIR CONDITIONER
36 BATTERY
39 MG UNIT
40 TRAVELING MOTOR
42 FUEL CELL
44 HYDROGEN TANK

The invention claimed is:

1. A vehicle controller configured to control traveling of an electric vehicle which is any of a battery electric automobile and a fuel cell automobile, wherein
the vehicle controller is configured to
when the electric vehicle performs towing, in response to that an output of a battery configured to supply electric power to a traveling motor is equal to or higher than a predetermined reference output and an amount of remaining stored energy is equal to or lower than a predetermined amount of reference remaining energy,
judge that power consumption reduction is needed, and
partially limit a function of the electric vehicle, and
when the electric vehicle does not perform towing, in response to that the output of the battery is equal to or higher than the predetermined reference output and the amount of remaining stored energy is equal to or lower than the predetermined amount of reference remaining energy,
not limit the function of the electric vehicle, and
the amount of remaining stored energy is an amount of remaining charge in the battery in a case that the electric vehicle is the battery electric automobile, and is an amount of remaining stored hydrogen in a case that the electric vehicle is the fuel cell automobile.

2. The vehicle controller according to claim 1, wherein the vehicle controller is configured to judge whether or not the power consumption reduction is needed based on a distance to a point at which energy is to be supplied, in addition to the output of the battery and the amount of remaining stored energy.

3. The vehicle controller according to claim 1, wherein, the vehicle controller is configured to, in response to judging that the power consumption reduction is needed, execute at least one of:
a reduction of a vehicle speed of the electric vehicle;
a limitation on the output of the battery of the electric vehicle;
a forcible switching of an air conditioner to an internal air circulation operation mode of the electric vehicle; and
a limitation on an output of the air conditioner of the electric vehicle.

4. The vehicle controller according to claim 1, wherein, the vehicle controller is configured to, in response to judging that the power consumption reduction is needed, change how the function is limited and an amount of limitation based on at least one of the output of the battery and the amount of remaining stored energy.

5. The vehicle controller according to claim 1, wherein the vehicle controller is configured to, in response to that the output of the battery relative to a vehicle speed of the electric vehicle is equal to or higher than an electric power threshold, and the electric power threshold increases as the vehicle speed increases, judge that the towing is being performed.

6. The vehicle controller according to claim 1, wherein the vehicle controller is configured to, when the electric vehicle performs towing another vehicle, in response to judging that the power consumption reduction is needed, partially limit the function of the electric vehicle without limiting a function of the another vehicle.

7. The vehicle controller according to claim 6, wherein the vehicle controller is configured to, when the electric vehicle performs towing, in response to that (i) the output of the battery is equal to or higher than the predetermined reference output, (ii) the amount of remaining stored energy is equal to or lower than the predetermined amount of reference remaining energy, and (iii) a distance to a point at which energy is to be supplied is equal to or greater than a predetermined distance,
judge that power consumption reduction is needed, and partially limit the function of the electric vehicle.

8. The vehicle controller according to claim 7, wherein, the vehicle controller is configured to, in response to judging that the power consumption reduction is needed, execute at least one of: a reduction of a vehicle speed of the electric vehicle; a limitation on the output of the battery of the electric vehicle; a forcible switching of an air conditioner to an internal air circulation operation mode of the electric vehicle; and a limitation on an output of the air conditioner of the electric vehicle.

9. The vehicle controller according to claim 8, wherein the vehicle controller is configured to, in response to that the output of the battery relative to a vehicle speed of the electric vehicle is equal to or higher than an electric power threshold, and the electric power threshold increases as the vehicle speed increases, judge that the towing is being performed.

* * * * *